United States Patent

[11] 3,622,690

[72] Inventors Arthur W. Stephens Hightstown, N.J.; John J. Walsh, Yardley, Pa.
[21] Appl. No. 762,785
[22] Filed Sept. 26, 1968
[45] Patented Nov. 23, 1971
[73] Assignee RCA Corporation

[54] ELECTRONIC SCANNER UTILIZING A LASER FOR THE SIMULTANEOUS SCANNING AND REPRODUCING OF IMAGES
8 Claims, 4 Drawing Figs.

[52] U.S. Cl. .......... 178/5.2 R, 178/6.7 R
[51] Int. Cl. .......... H04n 1/46
[50] Field of Search .......... 178/5.2, 5.2 A, 5.4, 7.6, 6.7, 7.1 E

[56] References Cited

UNITED STATES PATENTS

| | | | |
|---|---|---|---|
| 3,100,815 | 8/1963 | Drake et al. | 178/5.2 A |
| 3,316,348 | 4/1967 | Hufnagel et al. | 178/6.7 |
| 3,144,510 | 8/1964 | Farber et al. | 178/5.2 A |
| 3,154,371 | 10/1964 | Johnson | 346/108 |
| 3,383,460 | 5/1968 | Pritchard | 178/5.4 BD |
| 3,396,401 | 8/1968 | Nonomura | 178/6.6 B |
| 3,314,075 | 4/1967 | Becker et al. | 178/6.7 |

*Primary Examiner*—Robert L. Griffin
*Assistant Examiner*—Donald E. Stout
*Attorney*—H. Christoffersen

ABSTRACT: An electronic color scanner scans original patterns such as photographs, pictures, etc. to provide a plurality of photographic film color separation negatives (or positives) of the original pattern. The color separations are subsequently processed into printing plates for printing color reproductions of the original pattern. The scanner utilizes a laser that simultaneously functions to scan the original pattern as well as to provide the light for producing the color separations. The laser reproducing light is also modulated to produce pulses having sizes corresponding to the tones in the original pattern so as to provide screened color separations of the original pattern.

INVENTORS
Arthur W. Stephens
& John J. Walsh

BY John T. O'Halloran
ATTORNEY

INVENTORS
Arthur W. Stephens &
John J. Walsh
BY John T. O'Halloran
ATTORNEY

ELECTRONIC SCANNER UTILIZING A LASER FOR THE SIMULTANEOUS SCANNING AND REPRODUCING OF IMAGES

BACKGROUND OF THE INVENTION

The printing process presently utilized in the graphic arts industry deposits ink on paper when it is desired to print all or a portion of a pattern and deposits no ink when the absence of a pattern is desired. Color reproduction requires the reproduction of many different colors and shades. This multitude of colors is produced in conventional printing processes by the three subtractive primary colors, cyan, magenta, and yellow. For high-quality reproduction a fourth ink, black, is also utilized. For large-volume reproduction of an original color pattern, there is prepared a set of halftone printing plates, with each carrying a halftone image of one color component of the original pattern. The original pattern is reproduced by overprinting with each printing plate so that the three printing inks visually combine to produce the correct colors.

The printing plates needed for color printing may be derived from photographic film color separations that are obtained by scanning the original pattern in an electronic color scanner machine. The color scanner typically scans the original pattern with white light obtained from an incandescent (tungsten) lamp and measures the tones or color in the pattern by filtering the scanned signal with red, blue, and green color filters. The amplitudes of the filtered signals indicate the color content of the original pattern. Since the color printing inks are not spectrally perfect and hence do not correspond exactly to the three subtractive colors, the filtered signals are corrected for these deficiencies by means of color correction circuits in the color scanner. The color corrected signals are utilized to control the light emitted from a gaseous glow lamp to produce continuous tone color separations of the original pattern. The continuous tone color separations are then screened photographically and further processed to prepare the halftone printing plates.

Such prior art color scanners exhibit certain deficiencies in that their speed of operation is relatively slow because of the relatively low level light output of gaseous glow lamps. Furthermore, when the original patterns are to be enlarged, the resolution of the reproduced separations is poor due to the difficulty of optically focusing to a fine point the scanning light derived from the incandescent scanner lamp.

SUMMARY OF THE INVENTION

A scanning machine is provided that utilizes a laser to simultaneously provide a first laser beam, for scanning an original pattern to derive pattern signals corresponding to the tones in the original pattern, and a second laser beam for projecting recording light upon a recording medium. The recording light in the second laser beam is modulated in accordance with the amplitudes of the pattern signals so as to simulate on the recording medium the tones in the original pattern.

An aspect of the invention is that screened color separations are provided by modulating the second laser beam to produce pulses having amplitudes or intensities corresponding to the tones in the original pattern.

DETAILED DESCRIPTION

Figure 1:
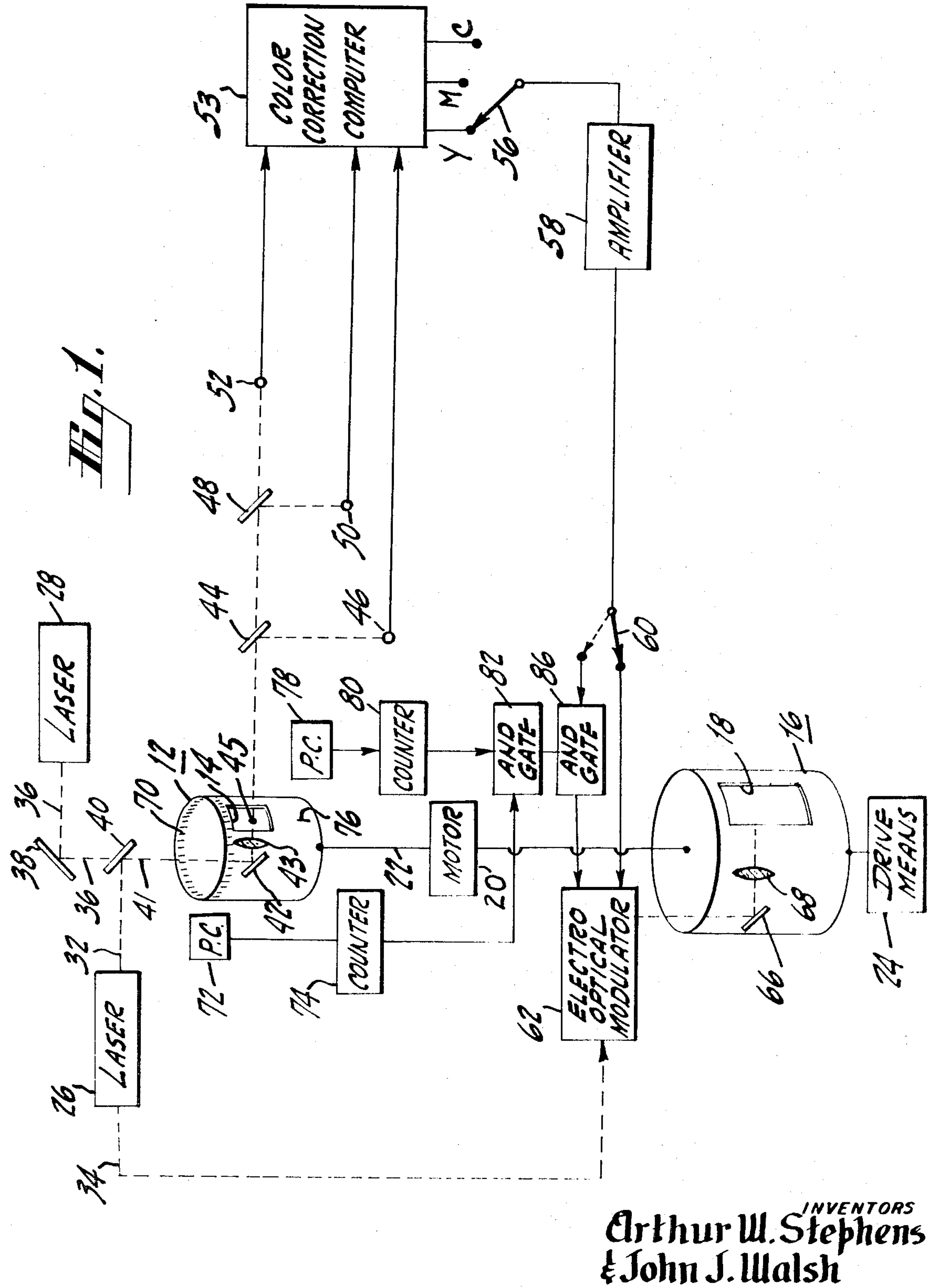
FIG. 1 is a schematic block diagram of an electronic color scanner embodying the invention.

In FIG. 1 there is shown an electronic color scanner 10 embodying the invention. Such an electronic color scanner 10 provides color corrected separation negatives or positives that are either screened or unscreened. The electronic color scanner 10 includes a transparent scanning cylinder 12 made of, for example, glass for supporting an original pattern 14. The scanner 10 also includes a transparent recording or reproducing cylinder 16 also made of glass for supporting thereon a recording medium 18 such as photographic film. The photographic film may, for example, comprise high gamma film. The recording cylinder 16 is mounted in a lighttight cassette (not shown) to prevent exposure of the film 18. The original pattern 14 may, for example, comprise a photographic transparency and will be described as such in the specification. However, it is also apparent that opaque patterns may also be reproduced by incorporating a reflective light pickup device in the electronic color scanner 10.

The color separations produced on the photographic film 18 may be either positives or negatives. The recording cylinder or drum 16 is shown larger than the scanning drum 12 in FIG. 1 to denote that enlarged separations of the original pattern 14 is provided by the scanner 10. It is apparent that rather than using cylinders of different sizes to produce enlarged separations of the original pattern 14 that other enlargement techniques may also be utilized.

The scanning and recording cylinders 12 and 16 are mounted coaxially with each other to be rotated in unison by a motor 20 coupled to the common axis 22 of the cylinders. Drive means 24 is positioned to translate axially both the cylinders 12 and 16 when the motor 20 rotates these cylinders. The rotation of the cylinders 12 and 16 as well as their axial translation causes an orthogonal scanning of the transparency 12 and an orthogonal recording on the recording medium 18.

Figure 2:
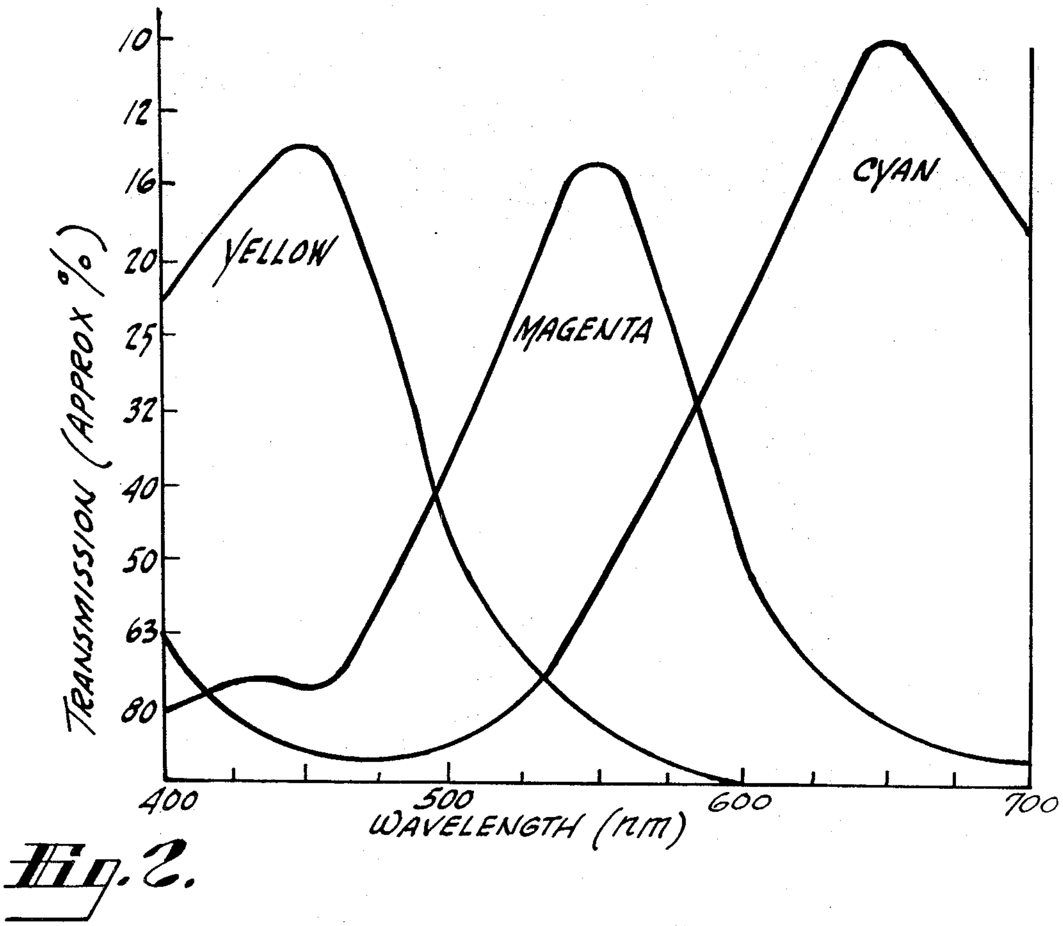
FIG. 2 shows the spectral transmission properties of the yellow, magenta, and cyan dyes utilized in multilayered photographic film.

Light from first and second laser sources 26 and 28 is utilized as the scanning light to measure the density of the tones contained in the transparency 14. The photographic transparency 14 includes layers of colored dyes that in combination simulate the colors or tones in the original scene that was photographed. In FIG. 2 there is shown the light spectrum transmission properties of the yellow, magenta, and cyan component dyes utilized in multilayered photographic film. It is to be noted that the yellow, magenta and cyan dyes, respectively, transmit the least light in the wavelengths of substantially 450 nm. (nanometers), 550 nm. and 650 nm. These wavelengths are in the blue, green and red spectrum areas, respectively. Accordingly, the lasers 26 and 28 are selected to exhibit light emission substantially at these wavelengths. The laser 26 may for example, comprise an argon laser that simultaneously emits monochromatic light, i.e., one frequency light, having wavelengths at 458 nm., 476 nm. and 488 nm., all of which are in the blue region of the light spectrum. An argon laser also emits light having a wavelength of 514 nm., which is in the green portion of the spectrum. Hence, both blue and green light is simultaneously available from the first laser 26 for scanning the transparency 20. The second laser 28 may, for example, comprise a helium-neon gas laser which emits light having a wavelength of 633 nm. which is in the red region. Hence, red light is also available from the laser 28 to scan the transparency 20. A single krypton laser which produces light in all of the regions, red, blue, and green, may be substituted for the two lasers 26 and 28 if desired.

The first laser 26 is operated in the fundamental mode, $TEM_{00}$, and both ends of this laser are apertured so as to provide first 32 and second 34 laser beams therefrom. The laser beam 36 from the second laser 28 is applied to a reflecting mirror 38 and both the laser beams 36 and 32 are applied to a dichroic mirror 40 positioned to merge the laser beams 32 and 36 and project a single resultant scanning beam 41 onto a reflecting mirror 42. The reflected light from the mirror 42 is focused onto the transparency 14 by a focusing lens 43. It is to be noted that a fine scanning spot 45 is provided by focusing a laser beam and the scanning spot exhibits a high radiance. The light from the scanning spot 45 is transmitted through the transparency 14 in accordance with the density of the tones or colors in the transparency 14. Greater or lesser amounts of certain wavelengths of light will be transmitted through each elemental area on the transparency 14 depending upon the color content thereof.

The light penetrating through the transparency 14 impinges on an interference filter 44 that is positioned to intercept and reflect light in the blue region of the spectrum onto a solar cell 46 and transmit the remaining light therethrough. Similarly, a second interference filter 48 is positioned to intercept the light transmitted through interference filter 44 and reflect light in the green region of the spectrum onto a solar cell 50. Finally, a third solar cell 52 is positioned to intercept the light transmitted through both the filters 44 and 48, which comprises light in the red region of the spectrum. It is to be noted that no color filters are needed in the scanner 10 since the scanning light is already separated into distinct colors or frequencies. It is apparent that a single prism may be substituted for the interference filters 44 and 48 because of this frequency separation. Additionally, the requirements on the selection of the interference filters 44 and 48 are less stringent because of this frequency separation.

The light impinging upon the solar cells 46, 50 and 52 is transduced by these cells into electronic separation signals and are applied to a color correction computer 53. Photodiodes or the like may be substituted for the solar cells if desired. The color correction computer 53 may, for example, comprise the color correction computer in one of the commercially available color scanners in the RCA 70/8800 series, such as the RCA Spectra 70/8802 machine. The color correction computer 53 corrects for the deficiencies in the printing dyes and provides consecutively a plurality of electronic color separation signals therefrom, corresponding to the colors yellow (Y), magenta (M), and cyan (C), depending upon the separation selected by a variable switch 56. A black separation may also be provided. The switch 56 is manually operated by an operator of the system to switch in sequence to the color separation desired. The color separation signal selected by the switch 56 is amplified in an amplifier 58 and is applied through a switch 60 to an electro-optic modulator 62 to produce continuous tone separations of the transparency 14. The modulator 62 also has applied thereto the second laser beam 34 derived from the first laser 26. Thus, the same laser 26 provides light for scanning the transparency 20 as well as provides the light for producing the separation 18 thereof.

The light modulator 62 modulates the light in the laser beam 34 in accordance with the amplitude of the electronic signals derived from the amplifier 58. When these signals are high, more light is passed by the modulator 62 than when the signals are low. Consequently, the light transmitted through the modulator 62 is a function of the amplitude of the electronic signals and hence is a function of the density of the tones in the transparency 14. Thus, the electronic pattern signals are effectively converted back into light signals. The light transmitted through modulator 62 is applied to a reflecting mirror 66 and the light therefrom is focused by a lens 68 onto the recording medium or film 18. One color separation 18 is provided for each position of the switch 56. If the glass in the cylinder 16 disperses the laser beam 34, then the film 18 may be mounted on the inside of the cylinder. Alternatively, an aperture over which the film 16 is mounted may be included in the cylinder 16.

In accordance with an aspect of the invention, screened color separations may also be provided by the color scanner 10. This is accomplished by periodically pulsing the modulator 62 to sequentially unblock and block the transmission of light therethrough. Consequently, the output of the modulator is a series of light pulses that provide the halftone dots necessary for a screened output. In order to provide the desired pulse sequence for such screening, a plurality of opaque timing marks 70 are superscribed on the periphery of the scanning cylinder 12 so that light from the scanning beam 40 is intercepted by each timing mark as the cylinder 12 rotates. The timing marks are spaced at desired distances apart, as for example, 0.008 inches apart, to provide a desired halftone dot spacing. A photocell 72 is positioned at the periphery of the cylinder 12 to detect these interruptions of light to provide corresponding electronic pulses. A counter 74 is coupled to the photocell 72 to count the pulses. Additionally, a single opaque timing mark 76 is also superscribed on the scanning cylinder 12 so that light is interrupted once upon every revolution of the cylinder 12. A photocell 78 is positioned to count these interruptions to effectively provide a scanline count. The scanner 12 may, for example, be operated by the motor 18 and drive means 24 to provide 500 scanlines per inch. Thus, it is convenient to utilize a 125-line screening pattern and hence the counter 80 is operated to produce an output count only on every fourth scanline.

The output of the counter 80 is applied to an AND-gate 82 to gate open the gate 82 on every fourth scanline and gate the pulses from the counter 74 therethrough. These pulses are applied to a second AND-gate 86 to be gated with the color corrected signal of the amplifier 58, when the switch 60 is thrown to the up position thereof. The AND-gate 86 when activated effectively samples the amplitude of the amplifier 58 to produce sampling signals to cause the modulator 62 to produce pulses corresponding to the amplitude of the amplifier 58. Thus, in one position of the switch 60, the scanner 10 provides continuous tone outputs of the transparency 14 and in the other position of the switch 60, the scanner 10 provides a screened halftone output of the transparency 14.

OPERATION

When it is desired to produce a continuous tone color separation, the switch 60 is thrown to the lower position thereof. The lasers 26 and 28 are turned on and the monochromatic light beams therefrom are merged into a single scanning beam 41. The scanning beam 41 is focused onto the inner surface of the cylinder 12. The laser beam 41 at this point exhibits a high radiance and a fine spot.

The rotation of the scanning cylinder 12 causes the scanning beam 41 to cut a scanning slice in the transparency 14 as the cylinder 12 rotates and the scanning slices are adjacent because the cylinder 12 is translated axially by the driving means 24. Each scanline produces varying amplitude light signals due to the color content of the transparency 12, which light signals are transmitted through the transparent cylinder 12 onto an interference filter 44. The interference filter 44 extracts the blue light in the transmitted light beam and projects it onto a solar cell 46 to convert the varying light signal into a varying electronic signal. The green light in the scanning beam is extracted by the interference filter 48 and converted into an electronic signal by the solar cell 50 whereas the remaining light, the red light, is converted by the solar cell 52. Inexpensive solar cells rather than, for example, photomultipliers, may be utilized to transduce the light signals into electronic signals because of the high radiance of a laser beam. The color component signals from the solar cells 46, 50, and 52 are applied to the color correction computer 53 to produce color corrected magenta, cyan, and yellow output signals. These varying signals are amplified in the amplifier 58 and applied through the switch 60 to the modulator 62. The other laser beam 34 derived from the second laser 26 is also applied to the modulator 62. The modulator 62 passes the laser beam light in accordance with the amplitude of the electronic signal derived from the amplifier 58. The modulated light output from the modulator 62 is focused onto the photographic film 18 to expose this film. Consequently, since the modulated light is a replica of the corresponding color component in the original pattern 12, the photographic film 18 produces a replica of the tones in the transparency 18.

The amount of light available in the laser beam 34 from the first laser 26 is large enough to cause the system 10 to operate at speeds that are much greater than heretofore attainable. This is because the radiance level in the modulated laser beam is sufficiently high so that the time for exposure of the film 18 is reduced substantially. Additionally, the highlight levels available in the scanning beam produces a high signal to noise ratio, which is a factor in permitting increased speed of operation. Thus, color separation may be prepared in minutes, rather than hours, as is needed in prior art color scanners.

The color separations may also be greatly enlarged because the extremely fine laser scanning spot 45 scans in such detail that even greatly enlarged separations exhibit good resolution. Prior art scanners cannot enlarge greatly without deterioration of resolution. Thus, the system 10 exhibits the desired characteristics of exhibiting a high speed of operation, of permitting large color enlargements of the original transparency 20, and of eliminating color filters.

The electronic color scanner 10 also exhibits the desirable characteristic of being able to provide a screened or halftone output color separation of the transparency 14. To provide such an electronically screened color separation, the switch 60 is throw to the position that is upper in FIG. 1. This causes modulator 62 to be activated only on every fourth scanline and only at the occurrence of a pulse output from the counter 74.

Figure 3:
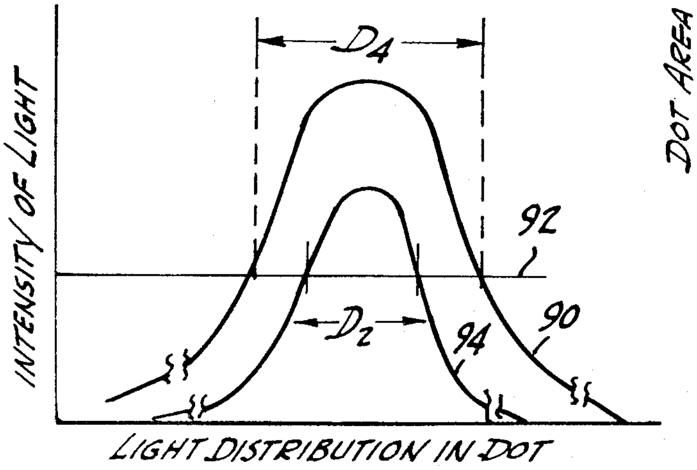
FIG. 3 is a graph of the light distribution of the recording laser beam.
Figure 4:
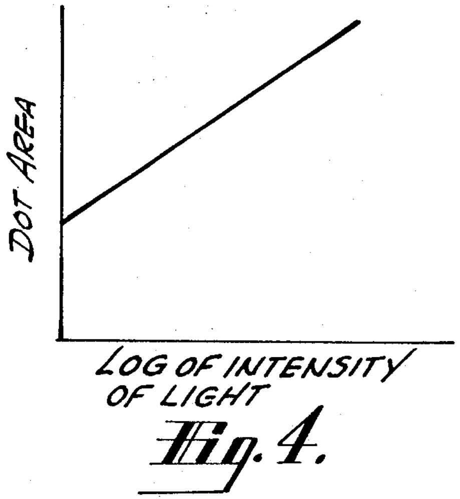
FIG. 4 is a graph illustrating the relationship between the recording laser beam diameter and the intensity of the tones in the original pattern.

A desirable screened pattern is provided by the electronic scanner 10 because the light emanating from the laser 26 is gaussian in nature, as shown in FIG. 3. FIG. 3 is a graph of the light distribution in the reproducing laser dots versus the light intensity in the dot. It is to be noted from the curve 90, that the light is more intense in the center of the dot than at the edges thereof. When high gamma photographic film is utilized as the recording medium in the scanner 10, the film exhibits a threshold 92 of intensity which causes light below this intensity level to have no affect on the film. When the modulated light increases above this threshold, the film is exposed. At high light levels such as the curve 90, the halftone dot exhibits a diameter $D_1$. At lower light levels such as shown by the curve 94, the halftone dot exhibits a diameter $D_2$. Thus, the halftone dot diameters vary with the light intensity which in turn varies in accordance with the color tones on the transparency 14. In FIG. 4, there is shown the variation in dot size versus the variation in intensity of light transmitted by the modulator. When the first screened color separation is produced, for example, at a screening angle of 0°, the remaining color separations are rotated to 37°, and 50° screening positions, respectively.

Thus in accordance with the invention, an electronic color scanner is provided that utilizes a laser beam for both scanning and recording to provide either a continuous tone color separation or a halftone color separation at speeds heretofore unattainable. The separations may be greatly enlarged over the original pattern.

What is claimed is:

1. A scanner for scanning an original pattern to produce a tonal representation thereof on a photosensitive recording medium, comprising in combination, laser means for providing first and second laser beams, means for scanning said original pattern with said first laser beam to provide a tonal signal representative of said original pattern, a counter coupled to count said timing pulses means for gating a preselected output of said counter with said tonal signal to produce a sequence of tonal signal pulses, an electro-optical modulator coupled to modulate said second laser beam, means for applying said pulses to said modulator to modulate said second laser beam to produce a sequence of output pulses having varying intensities that correspond to said tonal signal pulses, and means for applying said output pulses to said photosensitive recording medium to produce halftone dots having sizes related to the intensities of said tonal signal pulses to produce a halftone replica of said original pattern on said recording medium.

2. A scanner in accordance with claim 1 wherein said photosensitive recording medium comprises, a high gamma photographic film exhibiting a light intensity threshold characteristic, below which intensity said film is insensitive to light.

3. A scanner in accordance with claim 1 wherein said laser means includes, a plurality of lasers for producing output laser beams, means for combining said output laser beams into said first laser scanning beam, and means for generating a plurality of timing pulses during the scanning of said original pattern.

4. A scanner in accordance with claim 1 wherein said laser means comprises a single laser preselected to radiate light of a plurality of discrete wavelengths corresponding to additive primary colors to form said first laser scanning beam.

5. The combination in accordance with claim 3 wherein said lasers emit monochromatic light in the red, green, and blue regions of the light spectrum only.

6. A scanner in accordance with claim 5 wherein said monochromatic light signals are separately extracted from said scanning beam after scanning said original pattern to derive color separations of said original pattern.

7. A scanner in accordance with claim 4 wherein said discrete color wavelengths are separately extracted from said scanning beam after scanning said original pattern to derive color separations of said original pattern.

8. A scanner in accordance with claim 5 wherein said extracted color signals are color corrected and then applied to control said optical modulator.

* * * * *

UNITED STATES PATENT OFFICE
CERTIFICATE OF CORRECTION

Patent No. 3,622,690 Dated November 23, 1971

Inventor(s) Arthur W. Stephens and John J. Walsh

It is certified that error appears in the above-identified patent and that said Letters Patent are hereby corrected as shown below:

In Column 5, line 7, "separation" should read ---separations---. In column 6, line 7, after "original pattern," add the following paragraph:

---means for generating a plurality of timing pulses during the scanning of said original pattern,---;
line 30, after "beams," insert ---and---; lines 32 to 34, delete ", and means for generating a plurality of timing pulses during the scanning of said original pattern".

Signed and sealed this 3rd day of October 1972.

(SEAL)
Attest:

EDWARD M.FLETCHER,JR.
Attesting Officer

ROBERT GOTTSHHALK
Commissioner of Patents

RM PO-1050 (10-69)
30 6|72

USCOMM-DC 60376-P69
☆ U S GOVERNMENT PRINTING OFFICE 1969 O—366-334